United States Patent [19]

Dooley, Jr. et al.

[11] 4,117,317
[45] Sep. 26, 1978

[54] PROGRAMMABLE CONTROLLER WITH HARDWIRED BACKUP CONNECTING TERMINALS AND RELATED CONTROL SYSTEM USING PROGRAMMABLE CONTROLLER AND HARDWIRED BACKUP

[75] Inventors: Philip G. Dooley, Jr., Bolton; Sidney C. Oakleaf, Old Saybrook, both of Conn.

[73] Assignee: Dynage, Incorporated, Bloomfield, Conn.

[21] Appl. No.: 712,885

[22] Filed: Aug. 9, 1976

[51] Int. Cl.² ............................................. G06F 9/00
[52] U.S. Cl. ............................... 235/307; 235/303.3; 364/114; 364/119
[58] Field of Search ............... 235/153 AE, 153 AK, 235/151.1, 150.1, 307, 303.3; 340/172.5; 445/1; 176/24, 25; 318/563, 564; 364/114, 119

[56] References Cited

U.S. PATENT DOCUMENTS

| | | | |
|---|---|---|---|
| 3,503,048 | 3/1970 | Avsan et al. | 235/153 AE |
| 3,665,172 | 5/1972 | Spaargaren et al. | 318/564 |
| 3,786,433 | 1/1974 | Notley et al. | 235/153 AE |
| 3,829,668 | 8/1974 | Noumi et al. | 235/153 AE |
| 3,875,390 | 4/1975 | Eccles et al. | 235/153 AE |
| 3,882,304 | 5/1975 | Walters | 235/151.11 |
| 3,882,406 | 5/1975 | Graves et al. | 235/153 AE |
| 3,931,500 | 1/1976 | Berkebile et al. | 176/24 |
| 3,931,505 | 1/1976 | Sevcik | 235/153 AE |

*Primary Examiner*—Charles E. Atkinson
*Attorney, Agent, or Firm*—McCormick, Paulding & Huber

[57] ABSTRACT

A controller of the data processing type including a memory programmable to adapt it to a wide variety of industrial machine and process control applications includes terminals permitting a hardwired logic circuit to be connected with the controller to supplement or improve its control functions. In particular, the hardwired logic backup may act as a redundant safety circuit responding to certain danger signals from the controlled process or may be used to enhance the response time or other characteristics of the controller in certain situations.

5 Claims, 4 Drawing Figures

PROGRAMMABLE CONTROLLER WITH HARDWIRED BACKUP CONNECTING TERMINALS AND RELATED CONTROL SYSTEM USING PROGRAMMABLE CONTROLLER AND HARDWIRED BACKUP

BACKGROUND OF THE INVENTION

This invention relates to a programmable controller and deals more particularly with such a controller which includes terminals permitting a hardwired logic circuit to be connected with the controller to provide a safety override or redundancy to a portion of the control system or to otherwise augment the functions of the controller.

Programmable controllers of the type with which this invention is concerned have a wide variety of applications in the machine and process control field. They may, for example, be used to control the operation of complex machine tools, the operation of furnaces, generators and other equipment in a power station, the operation of a chemical processing facility or the operation of a material handling and/or assembly line. Through the use of a programmable memory, the controller may be readily supplied with a set of instructions to adapt it to a particular control situation, thereby allowing one design of controller to be easily and inexpensively custom tailored to a selected particular process and enabling the control function of the controller to be readily changed as changes or adjustments are made in its related process.

Programmable controllers are usually quite complex and because of this are subject to some failures or errors. The incidence of such failures and errors is generally very low, but as to some which might occur, particularly those having the potential for causing a disaster, it may be desirable to provide some control redundancy. Also, in the case of some processes or machines, a controller may be used only while the process or machine is progressing in a normal operating condition. At other times, as when the process or machine is being brought up to or shut down from its normal state, manual control may be used in place of the controller, but even during manual control, it may be desirable to have an automatic safety override to supplement the manual control in one or more critical areas.

Programmable controllers of the type in question operate by reading a plurality of input signals originating from sensors detecting various parameters of the controlled system and process such input data to provide a plurality of output signals in turn controlling the operation of valves, switches, solenoids, relays or other control devices controlling various variables of the system. Due to the time required for processing the data and the fact that the processor generally works in scans during which the different inputs are processed in sequence, some discrete amount of time usually elapses between the change in an input signal and a corresponding change in a related output signal. In some very time sensitive systems, for example, some chemical mixing processes where quantities of liquids are measured by turning on and off valves, this processor response time may be too coarse for adequate or satisfactory results.

The general object of this invention is, therefore, to provide a programmable controller to which supplementary hardwired logic circuits may be readily added to provide supplementary redundant or override control of selected parts of the controlled system for safety purposes, or to improve the response time or other characteristics of the programmable controller in certain circumstances.

A further object of the invention is to provide a means enabling ready connection of a supplementary hardwired logic circuit to a programmable controller and whereby a hardwired logic circuit connected through the use of such means uses the same input sensors, input signal converters, output signal converters, and control devices as does the programmable controller thereby eliminating the need for additional sensors, input converters, output converters or control devices.

Other objects and advantages of the invention will become apparent during the course of the following description and from the claims forming a part hereof.

SUMMARY OF THE INVENTION

This invention resides in a programmable controller having terminals through which selected input signals may be transmitted to an auxiliary hardwired logic, and through which output signals from such hardwired logic may be introduced to the final outputs of the controller. In particular, the controller includes a plurality of input converters which convert signals from monitored sensors into input signals compatible with the remainder of the controller. Each input converter has a first output terminal through which its output signal passes to the remainder of the controller, and connected to this terminal, preferably through an isolating amplifier, is a second terminal to which a wire may be optionally connected to transmit the signal to a hardwired logic. The controller also includes a plurality of output converters which convert logic level signals from the remainder of the controller into drive signals for the remote related controlled devices. Each output converter has as its input the output of a two input OR gate. One input of the OR gate serves as the terminal through which output signals from the controller pass to the output converter, and the other input terminal of the OR gate serves as a second terminal to which a wire may be optionally connected to introduce an output signal from a hardwire logic to the output converter.

The invention also resides in the input and output converters being provided on circuit boards which in turn plug into mother boards defining the back planes of modules, the hardwire terminals being located on the rear of the mother board, and preferably in the form of rearwardly extending lugs or pins, so as to be readily accessible from the rear of the module.

Still further, the invention resides in a control system utilizing a programmable controller of the aforegoing type in combination with a hardwired logic circuit connected between certain hardwire terminals of the input converters and certain hardwire terminals of the output converters so as to provide redundancy for certain portions of the control system and/or to improve certain operating characteristics of the controller.

Other objects and advantages of the invention will be apparent from the following description and from the drawings and claims forming a part hereof.

DETAILED DESCRIPTION OF THE PREFERRED EMBODIMENTS

Figure 1:
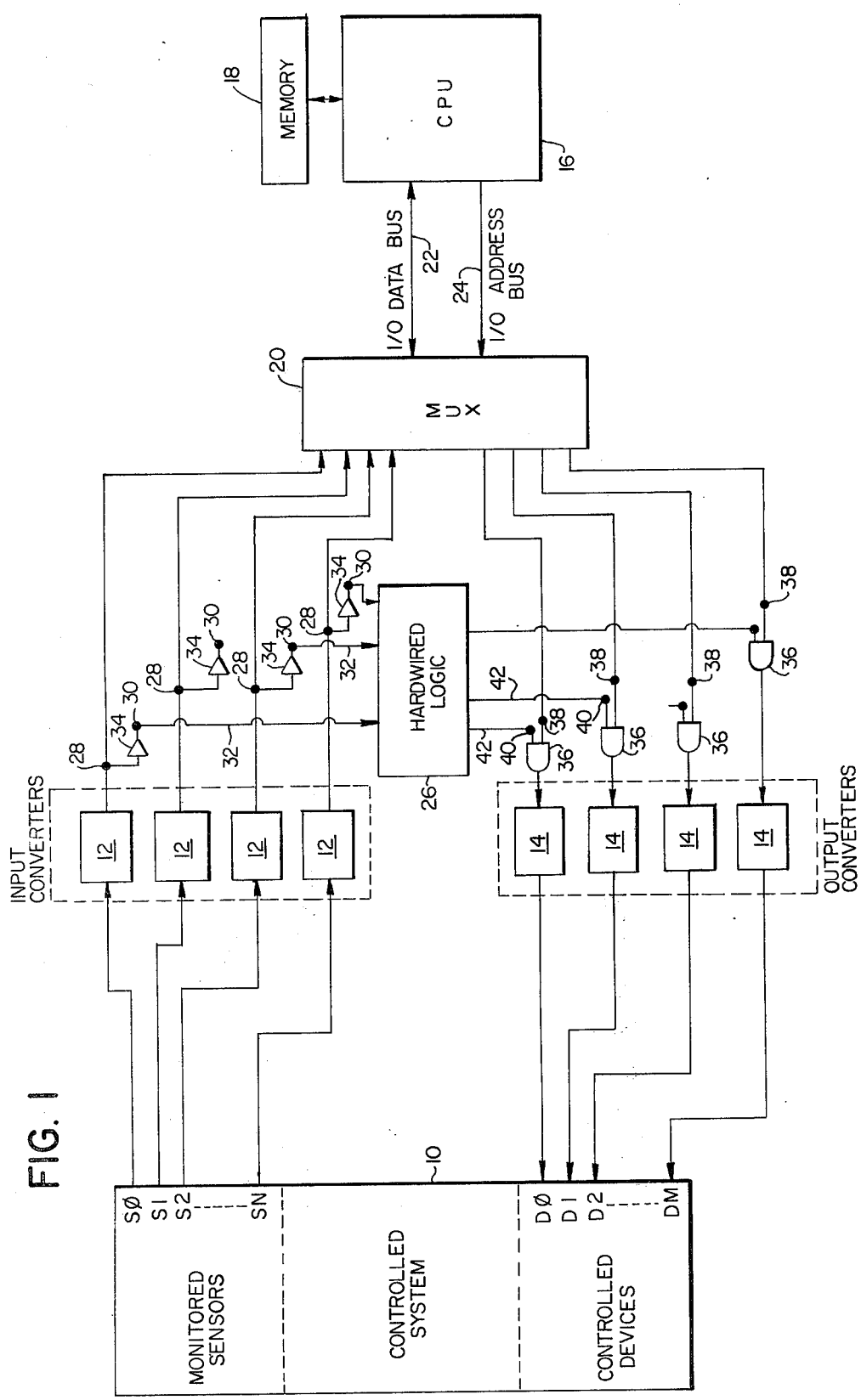
FIG. 1 is a schematic diagram illustrating a system controlled by a programmable controller having a hardwired logic circuit connected therewith in accordance with one embodiment of this invention.

Referring first to FIG. 1, a controlled system is there indicated at 10 and, as previously mentioned, may be any one of a wide variety of industrial machines or processes such as a machine tool, a chemical manufacturing or refining process, or the furnace and boiler of an electrical power station or other utility. Associated with the controlled system are a number of sensors which detect various operating parameters of the system and produce a plurality of corresponding monitored output signals $S\phi$ to SN. Also associated with the process is a plurality of controlled devices which control various process variables in response to a corresponding plurality of drive signals $D\phi$ to DM. The number N of monitored signals may or may not be equal to the number M of drivesignals. As a specific example, the controlled system may be a furnace in which case the monitored sensors may be temperature, pressure and flame detectors, among others, located at various points in the furnace, and the controlled devices may be dampers, pumps, valves and igniters also located at various points in the furnace and controlling fuel flow and other factors.

The programmable controller of FIG. 1 includes a plurality of input converters 12, 12, a plurality of output converters 14, 14, a central processing unit (CPU) 16 and a memory 18. Transmission of data from the input converters to the CPU and from the CPU to the output converters is accomplished through the use of a multiplexed communication system including a multiplexer 20, an input-output (I/O) data bus 22 and an I/O address bus 24. The use of such multiplexed communication system is not essential to the broader aspects of the invention but is desirable to facilitate use of the controller with a large number of monitored sensors and control devices.

The input converters 12, 12 convert signals from the monitored sensors into binary logic level signals compatible with the remainder of the controller. Likewise, the output converters 14, 14 convert binary logic level signals into drive signals compatible with their respectively associated controlled devices. In the illustrated case, the monitored signals $S\phi$ to SN are all taken to be binary signals so that all of the input converters 12, 12 are digital to digital converters. This, however, is not a necessary condition, and some of the signals from the monitored sensors may be analog signals with the associated input converters being analog to digital converters. Similarly, the controlled device signals $D\phi$ to DM are taken to be binary signals, but in other circumstances some of them may be analog signals emanating from digital to analog output converters. In any event, input data from input converters is transmitted to the CPU 16 through the multiplexer 20 and I/O data bus 22. This input data is processed by the CPU in accordance with a set of binary coded instructions loaded into a programmable portion of the memory 18 to in turn produce output signals transmitted by way of the I/O data bus 22 and multiplexer 20 to output converters. Address signals appearing on the I/O address bus 24 control the multiplexer 20 and identify the input or output addresses of the data appearing on the I/O data bus 22 at any given time.

As so far described, the programmable controller of FIG. 1 is of a generally known construction and operation. In accordance with the invention, however, the control system further includes a hardwired backup logic circuit 26 connected between selected ones of the input converters 12, 12 and selected ones of the output converters 14, 14. To permit the incorporation of a hardwired backup logic, such as the circuit 26, into the control system, each input converter 12 has one terminal 28 through which its output signal is transmitted to the CPU 16 and a second or hardwire terminal 30 to which a wire 32 may be connected to transmit the output signal of the converter to the hardwired logic circuit 26. Also, an isolating amplifier 34 is preferably included between each terminal 28 and its associated hardwired terminal 30 to isolate from the terminal 28 any load connected to the terminal 30.

As to the output converters 14, 14, each such converter has as its input the output of an associated two input OR gate 36. One input terminal 38 of each OR gate serves to receive input signals from the CPU 16. The other terminal 40 is a hardwire terminal to which a wire 42 may be connected to introduce to the associated output converter an output signal from the hardwired logic circuit 26.

The hardwired logic circuit 26 is essentially connected in parallel with the CPU 16 and preferably provides control functions redundant to some of those provided by the CPU. The hardwired logic is generally not intended as a full control system and is generally not intended to keep a complex controlled system running of itself, although such use may be made of the hardwired logic, if desired. Instead, the logic scheme of the circuit 26 may be such as to provide redundant or override control for safety purposes in response to certain danger signals from the monitored sensors indicating the presence of an emergency or potentially disastrous condition. For example, the going high of certain signals from the monitored sensors may indicate corresponding detected temperatures having exceeded user defined disastrous levels, and in response to the presence of any one such high signal the hardwired logic circuit may provide output signals which drive selected control devices to cut off fuel flow, close dampers or to take other action tending to return the process to a safe state.

In the arrangement as above described, the output signals from the hardwired logic circuit 26 are parallel with similar signals from the CPU and, therefore, act to backup the CPU in a redundant fashion to prevent a calamity as a result of the CPU failing to respond to an input danger signal. Further, when the CPU is known to be inoperative, because of a known failure or because of being intentionally disabled, as during start-up or shut-down of the controlled system, the hardwired logic circuit acts as a safety override to supplement manual control of the system and again in response to the detection of danger signals from the monitored sensors will operate selected control devices to drive the system to a safe condition.

Figure 2:
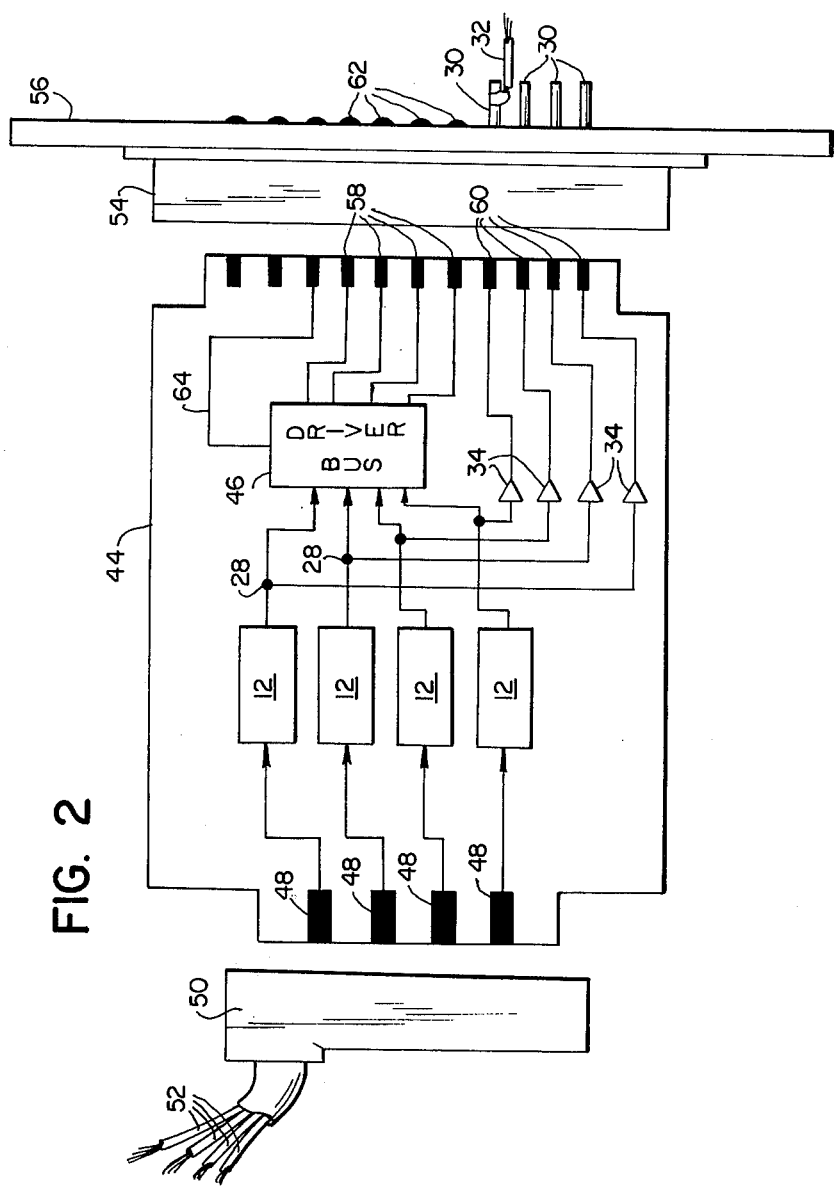
FIG. 2 is a view partly in elevation and partly schematic showing the construction of a circuit board containing several of the input converters of FIG. 1 and associated edge connectors and mother board.
Figure 3:
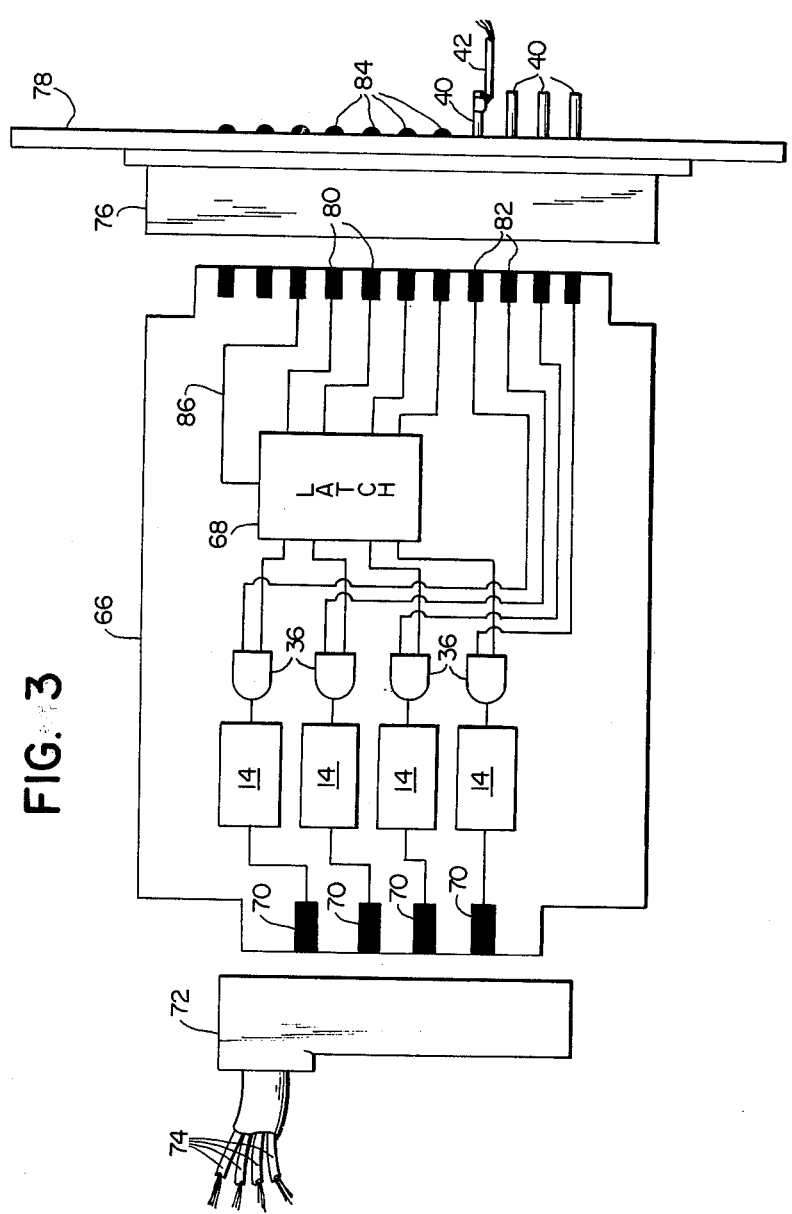
FIG. 3 is a view partly in elevation and partly schematic showing the construction of a circuit board containing several of the output converters of FIG. 1 and associated edge connectors and mother board.

FIGS. 2 and 3 show the way in which the hardwire terminals 30, 30 and 40, 40 of FIG. 1 are preferably provided in accordance with another aspect of this invention. In general, the input converters and their associated isolating amplifiers, and the output converters and their associated OR gates, are contained on printed circuit boards which plug into one or more mother boards, depending on the size of the system. Each mother board in turn defines the back plane of a module received in an equipment rack or cabinet and provides each hardwire terminal 30 or 40 in the form of a lug, pin or other similar part to which a wire may be wrapped, soldered or otherwise connected to transmit a signal to or from a hardwired logic circuit which may comprise another module contained in the equipment rack or cabinet.

Referring to FIG. 2, the printed circuit board 44 there shown includes four input converters 12, 12, an associated set of four isolating amplifiers 34, 34 and a bus driver 46. The forward edge of the board includes four terminal pads 48, 48 through which the four input converters 12, 12 may be connected to four monitored sensors through a forward edge connector 50 and four associated lines 52, 52. The rear edge of the board is receivable by an edge connector 54 mounted on a mother board 56, it including a set of four output terminal pads 58, 58 connected to the four input converters through the bus driver 46 and a second set of four terminal pads 60, 60 connected to the four input converters through the four isolating amplifiers. When the circuit board 44 is plugged into the rear edge connector 54, the four pads 58, 58 are respectively connected to four lines of the I/O data bus 22 through four conductors 62, 62 on the mother board. Also, the four pads 60, 60 are connected respectively to four hardwire terminals 30, 30 to any one of which a wire 32 may be connected as previously described. The bus driver 46 is part of the multiplexer 20 of FIG. 1 and in response to a control signal appearing on the line 64, generated in response to the address of the illustrated board 44 appearing on the I/O address bus, is enabled to transfer the outputs of the input converters 12, 12 to the terminal pads 58, 58.

Referring to FIG. 3, the printed circuit board 66 there shown includes four output converters 14, 14, their associated four OR gates 36, 36 and a latch 68. At the forward edge of the card are four terminal pads 70, 70 through which the outputs of the converters 14, 14 are transmitted to four control devices through a forward edge connector 72 and four associated lines 74, 74. The rear edge of the circuit board 66 is adapted to be plugged into a rear edge connector 76 mounted on a mother board 78, the rear edge including four terminal pads 80, 80 connected to the OR gates 36, 36 through the latch 68 and four other terminal pads 82, 82 directly connected to the OR gates. When the circuit board is plugged into the connector 76, the four pads 80, 80 are connected through four conductors 84, 84 on the mother board to four lines of the I/O data bus 22. The four pads 82, 82 are in turn connected to four hardwire terminals 40, 40 to any one or more of which a wire 42 may be connected as previously described. The latch 60 forms part of the multiplexer 20 of FIG. 1 and when enabled by a signal on the line 86, in response to the address of the card 66 appearing on the I/O address bus, causes the four outputs at the illustrated left-hand side of the latch to follow respectively the four inputs at the righthand side of the latch and to hold the outputs at the left-hand side at their last values when the enabling signal disappears.

In FIGS. 2 and 3, four input or output converters per printed circuit board have been shown for convenience only and it will be understood that each printed circuit board may contain more or less converters if desired without departing from the invention.

Figure 4:
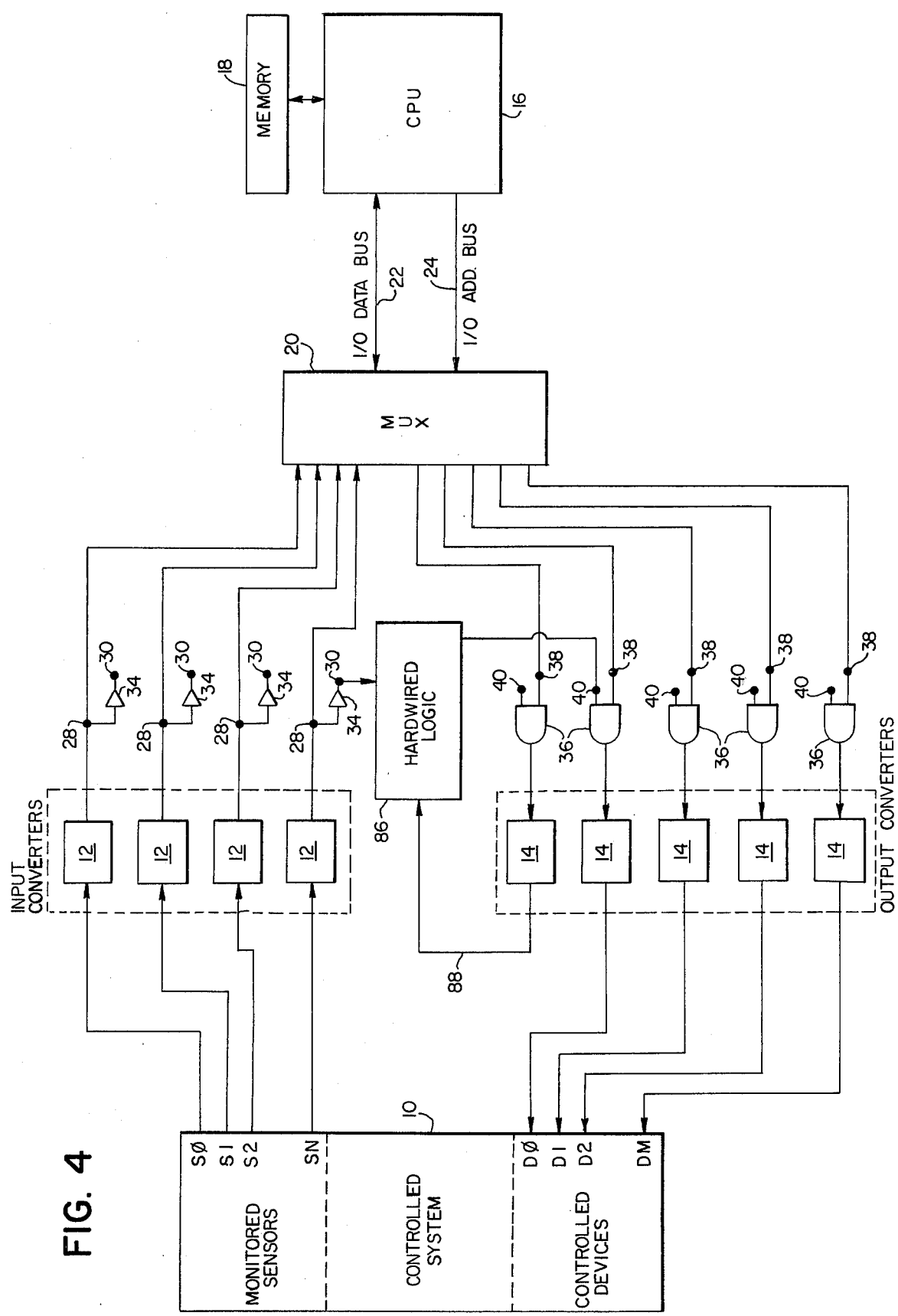
FIG. 4 is similar to FIG. 1 but shows a hardwired logic circuit connected to a programmable controller in accordance with another embodiment of this invention.

FIG. 4 shows a control system which is generally similar to that of FIG. 1. Parts of the system of FIG. 4 which are similar to that of FIG. 1 have, therefore, been given the same reference numerals as the corresponding parts of FIG. 1 and need not be further described. The control system of FIG. 4 differs from that of FIG. 1 in that the hardwired logic circuit 86 in addition to being responsive to at least one input from one of the input converters 12, 12 also has at least one input from the CPU 16 of the programmable controller. Since output signals from the CPU 16 are available as outputs from the output converters 14, 14, the signal from the CPU to the hardwired logic 86 is supplied through one of the output converters 14 and the associated line 88.

The scheme of FIG. 4 may be used in various different ways. For example, the signal appearing on the line 88 might be one generated by the CPU in response to a program, power or other failure within the CPU and may enable the hardwired logic circuit 86 to respond to an input signal or signals from the input converters to provide output signals to one or more output converters to steer the controlled process to a safe condition.

In another way, the scheme of FIG. 4 may be used to enhance the operating characteristics of the system. For example, in the control plan for the process, it may be desired to have the operation of a selected control device occur simultaneously with the detection of a given monitored input signal. Thus, the CPU may operate to count pulses occurring in the SN monitored signal and to produce an output signal operating a control device when the count reaches a predetermined value. However, the scan or response time of the CPU may be too coarse for adequate or satisfactory control. Therefore, in the FIG. 4 system, the operating program for the CPU may be such that when the count in question reaches its next to last value, a signal appears on the line 88 which enables the hardwired logic 86 to cause an output signal to be transmitted to the appropriate output converter 14 immediately upon the occurrence of the next occurring SN pulse, thereby eliminating any time lag due to the operation of the CPU, the multiplexer and other related parts of the programmer. That is, in the counting process performed by the CPU, on the next to last count, control is turned over to the hardwired logic circuit 86 which then monitors for the occurrence of the next counted pulse or signal and upon such occurrence causes direct activation of a controlled device without need for the signal to be transmitted to and processed by the CPU.

We claim:

1. An improved means for controlling a given operating system, said means including a plurality of sensors for monitoring given parameters of said system and for producing a plurality of monitored signals representative of said parameters, a plurality of controlled devices for varying given parameters of said system in response to a respectively associated plurality of control signals, a programmable controller including a memory programmable with a set of binary coded instructions and a processor for processing a plurality of binary data input signals in accordance with the set of instructions stored in said memory to produce a plurality of binary data output signals, a plurality of input converters for converting said monitored signals into binary data signals compatible with the remainder of said programmable controller, means for continually transmitting each of said binary data signals from said input converters to said processor as input signals for said processor, a plurality of output converters for converting said binary data output signals of said processor into a plurality of control signals compatible with said controlled devices, and means for continually transmitting said plurality of binary data output signals from said processor to said plurality of output converters with each of said output converters receiving a respectively associated one of said latter signals, and wherein the improvement comprises a hardwired logic circuit for converting a set of binary data input signals into a set of binary data output signals in accordance with a fixed logic scheme, means for continually supplying at least one of said binary data output signals from one of said input converters to said hardwired logic circuit as an input to said hardwired logic circuit, and means for continually supplying at least one binary data output signal from said hardwired logic circuit to one of said output converters as an input to said output converter in ORed relation to the input signal supplied to the same output converter by said processor.

2. An improved means for controlling a given operating system, said means being as defined in claim 1 and further characterized by each of said input converters having a first output terminal through which the binary data output signal of said input converter is supplied to said processor and a second terminal connected to said first terminal, said second terminal being in the form of a part to which a wire may be connected for transmitting the binary data output signal of the associated input converter to said hardwired logic, and said means for supplying at least one of said binary data output signals from one of said input converters to said hardwired logic circuit consisting of a wire connected between said second terminal of said one input converter and said hardwired logic.

3. An improved means for controlling a given operating system, said means being as defined in claim 2 and further characterized by an isolating amplifier connected between said first and said second output terminals of each of said input converters.

4. An improved means for controlling a given operating system, said means being as defined in claim 1 and further characterized by each of said output converters having an OR gate with two input terminals associated therewith with the output of the OR gate being the input to the output converter, the first of said input terminals of each of said OR gates being connected with said means for transmitting said plurality of binary data output signals from said processor to said plurality of output converters so as to have one of said output signals from said processor supplied thereto, the second of said input terminals of each of said OR gates being in the form of a part to which a wire may be connected for supplying another binary data signal to said OR gate, and said means for supplying at least one binary data output signal from said hardwired logic circuit to one of said output converters consisting of a wire connected between said hardwired logic circuit and said second terminal of the OR gate associated with one of said output converters.

5. An improved means for controlling a given operating system, said means being as defined in claim 1 and further characterized by an additional output converter, means for supplying one of said binary output signals of said processor to said additional output converter as an input to said additional output converter, and means supplying the output signal from said additional output converter to said hardwired logic circuit as an additional input to said hardwired logic circuit.

* * * * *